United States Patent [19]

Lemelson

[11] Patent Number: 4,901,096
[45] Date of Patent: Feb. 13, 1990

[54] CAMERA APPARATUS AND METHOD

[76] Inventor: Jerome H. Lemelson, 48 Parkside Dr., Princeton, N.J. 08540

[21] Appl. No.: 292,338

[22] Filed: Dec. 30, 1988

[51] Int. Cl.⁴ ............................................. G03G 17/38
[52] U.S. Cl. ..................................... 354/268; 354/430
[58] Field of Search ................... 354/75, 202, 268, 76, 354/70, 430

[56] References Cited

U.S. PATENT DOCUMENTS 3,690,234 9/1972 Costianes ............................. 354/430
4,673,276 6/1987 Yoshida et al. ...................... 354/430

Primary Examiner—Michael L. Gellner

[57] ABSTRACT

An apparatus and method for controlling the operation of a camera, such as a photographic camera or a still image recording electronic camera, to prevent the recording of picture information which is blurred due to camera movement while the shutter of the camera is open. In one form, a push-button or lever operated mechanism effects shutter opening when actuated by a finger of the hand wherein such shutter opening is prevented by a lock or braking mechanism which is activated by a signal generated when camera movement is detected by a motion sensor. In a second form, a camera shutter brake or lock normally prevents shutter operation and is released when a shutter actuating push button or lever is operated provided that a motion detector supported by the camera does not detect camera movement. In a third form, the camera shutter is operated to openb by a motor or solenoid when a control signal is generated by an electronic circuit such as a computer or microprocessor which processes signals generated when a motion sensor senses camera movement. The generation of a motion indicating signal prevents the shutter driving motor from operating to open the shutter even though a switch for connecting the shutter motor to a battery power supply is closed by hand. In a particular form, the signal generated when the camera motion sensor senses camera movement, is also applied to activate a display such as an electric light emitting diode, the direct or reflected light of which is viewable through the camera viewer or view finder to warn the photographer that the camera is not being held steadily enoght to take a proper picture.

19 Claims, 1 Drawing Sheet

CAMERA APPARATUS AND METHOD

SUMMARY OF THE INVENTION

This invention relates to camera apparatus which may be controlled in its operation by means of electronic means, such as a microcomputer or microprocessor. In particular, the invention defines a control system for the shutter of a camera which operates automatically to prevent same from opening until the camera is properly held by hand. As a result, distorted or blurred images in pictures or recordings taken by the camera are substantially eliminated.

The conventional photographic camera contains, in addition to a lens opening adjusting means which may be manually preset or adjusted by means of a motor driven mechanism, a shutter which may be manually or otherwise varied in its speed of operation and which is generally operated to open and suddenly close when an actuator, such as a pushbutton, is manually depressed. While the instant invention employs such a shutter, one or more means are provided for preventing it from opening while the camera is in motion, yet permitting it to be opened if its actuator mechanism is or has been manually operated and such camera motion has terminated. In a particular form, a time delay mechanism which is initiated in its operation when the shutter actuator is first operated by hand, prevents the shutter from opening after a select time delay and requires that the operator again depress the shutter mechanism if he seeks to take a picture. In yet another form, electronic sensing means senses movement of the camera and either merely operates a warning device, such as a light or beeper or simultaneously operates same together with an electronic or electromechanical means which prevents operation of the shutter until camera movement is no longer sensed whereupon the shutter is automatically operated to open and close by mechanical finger generated force or the operation of a motor enabled to operate when a switch is closed and a motion sensor fails to sense camera movement.

Accordingly it is a primary object of this invention to provide a new and improved apparatus and method for controlling the operation of a camera.

Another object is to provide an apparatus and method for automatically preventing the operation of a camera shutter if the camera is in motion.

Another object is to provide an apparatus and method for warning the operator of a camera that the camera is either in motion or being held unsteadily so as to indicate to the operator that an effort must be made to stop or reduce such camera movement if a proper recording is to be made.

Another object is to provide a camera shutter mechanism which is normally inoperable but is rendered operable by a control signal which is generated if a sensor mounted on the camera does not sense camera movement.

Another object is to provide a camera shutter mechanism which is rendered inoperable, even though a shutter actuator is manually depressed, when an electronic sensor senses camera movement.

Another object is to provide a camera shutter mechanism which can only operate to open a shutter for taking or recording picture information in the camera when the camera is held steady wherein a sensor of camera movement also provides means for controlling a warning device to warn the camera operator that the camera is in motion and cannot be operated.

Another object is to provide a camera shutter mechanism which is controlled in its operation by a microcomputer supported by the camera, which computer also controls other picture taking variables in response to signals generated by a plurality of sensors.

With the above and such other objects in view as will hereafter more fully appear, the invention consists of the novel combinations and arrangements of parts and methods for controlling the operation of a camera shutter, but it is to be understood that variations and modifications may be resorted to which fall within the invention as claimed.

IN THE DRAWINGS

Figure 1:
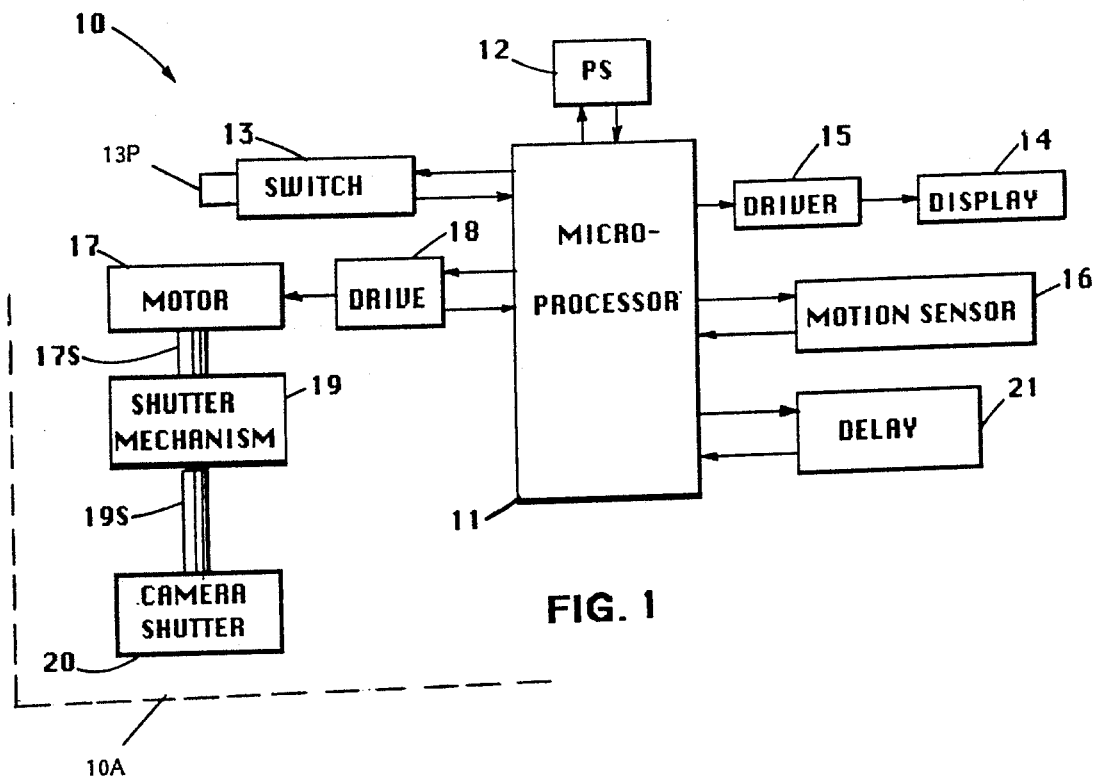
FIG. 1 is a schematic diagram of a first form of camera shutter control and warning system in which a shutter drive motor or solenoid is operated only if the camera is being held steady during a picture taking or recording operation.

In FIG. 1 is shown a first form of the invention defined by a control system 10 for controlling the operation of a shutter 20 of a camera denoted 10C, such as a still picture photographic camera or a still image recording electronic camera or television signal camera recording full frame video picture signals on a magnetic tape, disc or card or in digitized form in a solid state memory. A conventional camera shutter 20 may be one which is normally kept closed to prevent light from entering the camera to pass to unexposed photographic film, an image scanning cathode ray tube or an array of light pattern receiving charge coupled diodes (CCD) for generating output full frame video picture signals. A shutter operating mechanism 19 of conventional construction has its output drive mechanism, arm or shaft 19S connected or coupled to the shutter 20 and an input shaft or crank arm 17S connected to a push-pull solenoid or motor 17 which is operated in a shutter opening cycle when a drive 18 therefor is activated by a signal from a microprocessor or computer 11 supported within the camera housing along with the motor 17 and the shutter mechanism 19. The shutter mechanism 19 preferably includes means, such as a spring and/or override, for causing it to open the shutter 20 for the desired short interval and effect rapid closure thereof to allow a select amount of light to pass through the optical system of the camera to the film frame therein or the CCD screen against which such light is directed or focused. Conventional means may be provided for mechanically and/or electrically varying the time the shutter remains open in accordance with the film speed which may or may not be controlled by computer 11.

Connected to the computer or microprocessor 11 which may be employed to control other camera functions, such as automatic focus and shutter timing functions, is a power supply 12 such as a battery or batteries supported in the camera and a normally open manual push button switch 13, which may be located in one of the lines or leads extending to the battry 12, for gating its electrical energy, when closed, to the computer and its attendant devices. If the camera is held suitably stationary or steady when switch 13 is closed, electrical energy from battery 12 is gated to or applied by computer 11 to a drive circuit or device 18 to operate motor 17 in a controlled cycle to permit it to drive the shutter mechanism 19 causing the camera shutter 20 operated thereby to open and close during a select time interval as preset or predetermined in accordance with photographing variables defined by signals derived from one or more sensors sensing ambient light, distance to subject and/or other variables and connected to the microprocessor or computer 11 or an auxilliary microprocessor cooperating therewith.

If the camera, denoted 10C, is in motion when the manual pushbutton 13P of the switch 13 is depressed to close switch 13, such motion is sensed by a transducer 16, such as an accelerometer or other form of motion sensor, which is energized with electrical energy from battery 12 gated thereto through switch 13, which transmits a sensing signal to the microproprocessor 11. Such sensing signal is either processed in the microprocessor 11 to generate a control signal or is applied directly as a control signal to a switching circuit of the microprocessor or a switch external thereof, to retain open or operate same in a manner to prevent electrical energy from the battery 12 from operating the drive 18 for the shutter mechanism drive motor 17 until sensor 16 fails to sense camera movement whereafter drive 18 is activated, causing motor 17 to power operate shutter mechanism 19 operating the camera shutter 20 to operatively open and close.

The control signal generated when motion sensor 16 senses camera movement is also applied to a drive 15 for a display device 14, such as a lamp or light emitting diode, the direct or reflected light of which is in the field of view of the camera viewfinder (not shown) to permit the operator of the camera to view same while attempting to take a picture so as to be provided with a direct indication that the camera is not being held still or steady enough.to take a suitable picture and allow the shutter to open. Also shown in FIG. 1 is an electronic delay or timing circuit 21 connected to computer 11 which operates to provide a control signal to prevent closure of the described switch if a select time delay has elapsed from the closure of switch 13, even though the movement of the camera has stopped. Such delay may be preset or manually adjustable by the operator prior to taking a picture to account for possible changes in the image field with time which the camera operator may not want to photograph.

Figure 2:
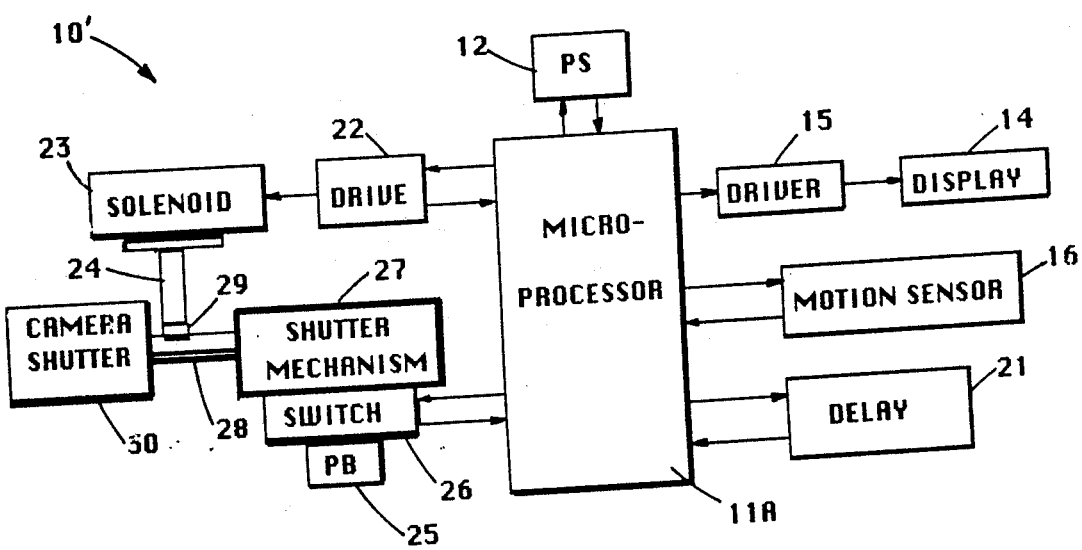
FIG. 2 is a schematic diagram of a second form of camera shutter control and warning system employing a brake or stop for preventing mechanical operation of a shutter by hand if the camera is in motion or unsteady during a picture taking or recording operation.

While the camera shutter control and drive system of FIG. 1 employs an electrical switch per se to initiate and effect picture taking by operating the shutter drive motor or solenoid 17, an alternative system 10' is shown in FIG. 2 in which a shutter mechanism is enabled to operate and open a camera shutter 30 by mechanical or spring driven action when a spring biased pushbutton 25 is finger operated and if a motion sensor 16,mounted on or in the camera housing, is not sensing camera movement. Connected to the pushbutton 25 and operable to be closed when the latter is first depressed by finger force, is an electric switch 26 which, like switch 13 of FIG. 1, may be directly connected to a terminal of battery 12 or connected through the microprocessor or computer thereto. Push button actuator 25 is also connected to drive a shutter mechanism 27 if the camera is not in motion. If the camera is in motion and such movement is sensed by a motion sensor 16, as described, signals output by such sensor are processed by microprocessor 11A to which switch 26 is also connected and applied, either directly or as a control signal derived from microprocessor 11A, to a drive 22 for a motor or solenoid 23, activating same and causing its output shaft 24 to be driven thereby against a stop 29, such as a cam or pin connected to a shaft, arm or linkage 28 forming part of the shutter mechanism 27, preventing the latter from operating the camera shutter 30. The motor or solenoid 23 or a mechaism which it drives, is spring biased to retract or counterrotate its shaft 24 out of the way of the stop 29, permitting the shutter mechanism 27 to drive the camera shutter to momentarily open for the desired time interval if force is maintained depressing the actuator or the pushbutton mechanism 25.

Other features of construction and operation found in the embodiment of FIG. 1, such as the viewfinder display 14 and the delay control means 21, may also be provided in system 10' of FIG. 2 for performing the functions described above. It is also noted that the visual display or lamp 14 may be replaced or supplemented by a sound generating transducer, such as a beeper which generates a warning sound if the push buttom 25 is depressed and camera motion is detected by the motion sensor 16, to warn the photographer to steady the camera in order to permit the taking of a picture.

The embodiments of FIGS. 1 and 2 may be modified in accordance with variations in camera constructions and modes of operation, particularly with respect to the specific mechanisms employed to permit and prevent operation of the camera shutter. In a particular form of the invention, a signal output by the motion sensor 16 when it senses camera movement in any direction, is applied to the switching input of a normally closed monostable switch in the computer or external thereof so as to open such switch and prevent battery current from activating drive 18 to operate the shutter mechanism drive motor 19 or the braking solenoid 23 in a manner to permit the shutter mechanism to open the shutter.

What is claimed is:

1. A camera apparatus comprising in combination:
   (a) a camera for taking still pictures and including a lens system for receiving light patterns of images to be photographed and a normally closed shutter for allowing, when opened, light to pass into said camera and to be recorded on a record medium therein, and manually operable means for causing said shutter to be briefly opened to allow light to be received and patterns thereof recorded in said camera, the improvement comprising:
   first means secured to said camera for sensing movement thereof and generating movement sensing signals,
   second means including electronic computing means for receiving, processing and analyzing said movement sensing signals and generating control signals,
   third means for receiving said control signals and preventing the operation of said shutter of said camera by a person attempting to employ said camera to take a picture.

2. A camera apparatus in accordance with claim 1 wherein said third means comprises an electro-mechanical means responsive to said control signals and operable to prevent the mechanical operation of said shutter while receiving said control signals.

3. An apparatus in accordance with claim 2 wherein said electro-mechanical means is normally biased to prevent the operation of the shutter of said camera and is driven when a manually operable actuator is operated by an operator of the camera to a position to permit the shutter of said camera to open when said actuator is manually operated provided that said first means is not sensing movement of said camera.

4. Camera apparatus in accordance with claim 2 wherein said electro-mechanical means comprises an electric motor or solenoid operable when activated by said control signals for interferring with the normal operation of said shutter by a finger of the hand of a person attempting to take a picture with said camera.

5. Camera apparatus in accordance with claim 4 including a spring-biased push button mechanism having a finger operable actuator connected to said camera shutter for causing same to open when actuated, said electro-mechanical means serving to prevent the operation of said camera shutter by said push-button mechanism when force is applied to the actuator thereof, when said thrid means operably receives control signals generated when said first means senses camera movement.

6. Camera apparatus comprising in combination:
(a) a camera for taking still pictures and including a housing and a lens system for receiving light from objects in the scanning field of said camera, and a normally closed shutter for allowing, when opened, light to pass into said camera and to be recorded on a record medium such as photographic film within said housing, and manually operable means for causing said shutter to briefly open to allow light to pass into said housing to said recording medium, the improvement comprising:
(a) first means supported by said camera for sensing movement of said camera and generating movement sensing signals,
(b) second means operable in response to receipt of said sensing signals for generating control signals, and (c) third means response to said control signals for preventing the operation of said normally closed shutter in the act of opening when hand force is applied to said manually operable means.

7. Camera apparatus in accordance with claim 6 wherein said second means comprises a microelectronic computer such as a microprocessor for receiving and processing sensing signals generated by said first means and generating said control signals.

8. Camera apparatus in accordance with claim 6 wherein said third means includes an electric motor operable to drive said normally closed shutter in a shutter opening operation and motor control means for controlling the operation of said electric motor, said motor being prevented by said control means from driving said shutter in response to receipt of said control signals.

9. Camera apparatus in accordance with claim 6 wherein said third means is operable to prevent the proper operation of said manually operable meas causing said shutter to open.

10. Camera apparatus in accordance with claim 6 including an electrically operated means for driving said shutter to open when said manually operable means is actuated, said third means comprising an electronic control means for preventing the oepration of said electrically operated shutter driving means in response to receipt of control signals generated by said second means.

11. Camera apparatus in accordance with claim 7 including an electric motor operable, when activated, to drive said shutter from said normally closed to an open condition and means for automatically driving said shutter closed after opening, said electric motor being controlled in its operation by said microelectronic computer in accordance with signals generated by said first means.

12. Camera apparatus in accordance with claim 6 including an electric battery supported by said camera housing a finger operated normally-open switch accessible to the exterior of said camera housing for connecting said battery to said first,second and third means when closed to permit said sensing means to sense camera movement and generate sensing signals. said second means to generate said control signals and siad third means to prevent the operation of said normally closed shutter in response to said control signals.

13. Camera apparatus in accordance with claim 6 including a warning lamp supported by said camera and viewable, when energized to emit light, to a person in the act of attempting to take a picture, and drive means for energizing said lamp in response to the generation of said control signals by said second means.

14. A method for controlling the operation of a camera comprising:
(a) sensing movement of a camera which is operable to receive light reflected from images to be recorded as still image information on a recording medium of said camera,
(b) generating electrical signals when movements of said camera are sensed, and
(c) applying said electrical signals to a control means which is operable in response thereto to prevent the operation of a shutter for said camera while said electrical signals are generated as a result of sensing camera movement.

15. A method for controlling the operation of a camera in accordance with claim 14 which includes applying manual force to an actuator of a switch supported by said camera to operate said switch in a manner to connect a source of electrical energy,such as a battery, to a sensing means for sensing said camera movement said means for generating said electrical signals and said control means to electrically energize same to permit said control means to prevent the operation of said camera while said sensing means senses camera movement and said control signals are generated.

16. A method for controlling the operation of a camera in accordance with claim 14 including also applying electrical signals generated when camera movements are sensed to drive a warning device to warn the operator of said camera that it is in motion and the camera cannot be operated to take a picture.

17. A method for controlling the operation of a camera in accordance with claim 14 wherein said electrical signals are applied to control the operation of a motor for operating said shutter.

18. A method for controlling the operation of a camera in accordance with claim 14 wherein said control signals are applied to control the operation of a motor for operating a means for mechanically preventing the operation of said shutter.

19. A method for controlling the operation of a camera in accordance with claim 14 wherein said electrical signals are also applied to a delay means for preventing the operation of said shutter if said electrical signals are not terminated in their generation by said sensing step after a select time interval of their generation.

* * * * *